US006934706B1

(12) United States Patent
Mancuso et al.

(10) Patent No.: US 6,934,706 B1
(45) Date of Patent: Aug. 23, 2005

(54) CENTRALIZED MAPPING OF SECURITY CREDENTIALS FOR DATABASE ACCESS OPERATIONS

(75) Inventors: Patrick Charles Mancuso, Center Tuftonboro, NH (US); Scott Howard Prager, Stratham, NH (US)

(73) Assignee: International Business Machines Corporation, Armonk, NY (US)

( * ) Notice: Subject to any disclaimer, the term of this patent is extended or adjusted under 35 U.S.C. 154(b) by 457 days.

(21) Appl. No.: 10/104,999

(22) Filed: Mar. 22, 2002

(51) Int. Cl.[7] ............................................. G06F 17/30
(52) U.S. Cl. ........................... 707/9; 707/10; 707/101; 707/102; 707/103; 707/104
(58) Field of Search ...................... 707/3, 10, 9, 101, 707/102, 103, 104; 709/225, 227; 455/414.2; 713/165, 193; 705/50, 402

(56) References Cited

U.S. PATENT DOCUMENTS

| | | | |
|---|---|---|---|
| 5,201,046 A | 4/1993 | Goldberg et al. | 395/600 |
| 5,615,361 A | 3/1997 | Leung et al. | 395/603 |
| 5,757,920 A | 5/1998 | Misra et al. | 380/25 |
| 5,768,503 A | 6/1998 | Olkin | 395/187.01 |
| 5,806,079 A | 9/1998 | Rivette et al. | 707/512 |
| 5,822,750 A | 10/1998 | Jou et al. | 707/2 |
| 5,870,747 A | 2/1999 | Sundaresan | 707/101 |
| 5,875,296 A | 2/1999 | Shi et al. | 395/188.01 |
| 5,899,986 A | 5/1999 | Ziauddin | 707/2 |
| 5,913,061 A | 6/1999 | Gupta et al. | 395/680 |
| 5,931,900 A | 8/1999 | Notani et al. | 707/201 |
| 5,940,819 A | 8/1999 | Beavin et al. | 707/2 |
| 5,944,824 A | 8/1999 | He | 713/201 |
| 5,960,200 A | 9/1999 | Eager et al. | 395/705 |
| 5,995,597 A | 11/1999 | Woltz et al. | 379/93.24 |
| 6,000,033 A | 12/1999 | Kelley et al. | 713/201 |
| 6,003,065 A | 12/1999 | Yan et al. | 709/201 |
| 6,006,214 A | 12/1999 | Carey et al. | 707/2 |
| 6,021,496 A | 2/2000 | Dutcher et al. | 713/202 |
| 6,065,120 A | 5/2000 | Laursen et al. | 713/201 |
| 6,078,924 A | 6/2000 | Ainsbury et al. | 707/101 |
| 6,078,926 A | 6/2000 | Jensen et al. | 707/103 |

(Continued)

FOREIGN PATENT DOCUMENTS

EP              991242 A       4/2000

(Continued)

OTHER PUBLICATIONS

Article 41387, Usage of UNC Names with DFS Web Secure for Windows NT, Research Disclosure, Sep. 1998.

(Continued)

Primary Examiner—Thuy N. Pardo
(74) Attorney, Agent, or Firm—Brown Raysman Millstein Felder & Steiner LLP

(57) ABSTRACT

An enterprise data integration product which facilitates access to one or more external or remote databases so as to provide integration from a central application. The product enables a user to pre-populate a credential database which stores the user's security credentials for each of the remote databases to which access is desired. When the user requests access to a remote database, the product automatically retrieves the user's security credentials for that database and establishes a connection thereto based on the retrieval credentials. In this manner, the product provides seamless access to the remote database while maintaining the user's pre-ordained access restriction thereto.

12 Claims, 5 Drawing Sheets

U.S. PATENT DOCUMENTS

| | | | |
|---|---|---|---|
| 6,088,451 A | 7/2000 | He et al. ...................... 380/25 |
| 6,091,412 A | 7/2000 | Simonoff et al. ........... 345/335 |
| 6,122,639 A | 9/2000 | Babu et al. .................. 707/103 |
| 6,128,738 A | 10/2000 | Doyle et al. ................ 713/185 |
| 6,145,086 A | 11/2000 | Bellemore et al. .......... 713/202 |
| 6,154,751 A | 11/2000 | Ault et al. ................... 707/201 |
| 6,157,953 A * | 12/2000 | Chang et al. ................ 709/225 |
| 6,178,511 B1 | 1/2001 | Cohen et al. ................ 713/201 |
| 6,449,474 B1 * | 9/2002 | Mukherjee et al. ...... 455/414.2 |
| 2001/0011349 A1 * | 8/2001 | Garrison ..................... 713/165 |
| 2001/0054155 A1 * | 12/2001 | Hagan et al. ............... 713/193 |
| 2003/0055985 A1 * | 3/2003 | Corb et al. .................. 709/227 |
| 2004/0088259 A1 * | 5/2004 | Celik ........................... 705/50 |
| 2005/0038758 A1 * | 2/2005 | Hilbush et al. ............. 705/402 |

FOREIGN PATENT DOCUMENTS

| | | |
|---|---|---|
| JP | 409034838 A | 2/1997 |
| JP | 11025048 A | 1/1999 |
| JP | 2000174807 | 6/2000 |

OTHER PUBLICATIONS

Article 429128, Servlet/Applet/HTML Authentication Process With Single Sign-on, Research Disclosure, Jan. 2000.
IEEE Wireless Communications and Networking Conference, (Cat. No. 99TH8466), Pt. vol.. 3, pp. 1397-1401, vol. 3, Published: Piscataway, NJ, USA, 1999.
US 6,021,479, 02/2000, Stevens (withdrawn)

* cited by examiner

Real Time Activity
Action/Peter Sing/CAM/Lotus
Current Status New

Identification — 57

Name: ⌈Open Event on Millennium Cafe⌋

Notes Application ❶  — 58A
Database: Millennium Java Cafe R5
Name: DECS\cafeR5.nsf
Form: RepInfoDECS

Lotus Connection ❷ [NEW] — 58B
Data Source: DB2EILABV(using"db2admin") DB2ADMIN_EMPLOYEE
Table: DB2ADMIN_EMPLOYEE

Mapping ❸ — 58C

| Key[s]: | DHR_ID[Text] | Key[s]: | EMPNO[Text] |
| Field[s]: | Bonus[Float] | Field[s]: | BONUS[Number] |
| | CostCenter[Text] | | WORKDEPT[Text] |
| | FirstName[Text] | | FIRSTNME[Text] |
| | Initial[Text] | | MIDINIT[Text] |
| | LastName[Text] | | LASTNAME[Text] |
| | Salary[Float] | | SALARY[Number] |
| | Title[Text] | | JOB[Text] |

Events ❹ — 58D
Documents Events to monitor ⌈Open⌋

▶ Options...

Scheduling ❺
Auto Start    ☐ Enabled

| User Name | Database Type | Sever | User ID | Password |
|---|---|---|---|---|
| x | DB2 | | userid1 | passwd1 |
| x | DB2 | d2server | userid2 | passwd2 |
| y | DB2 | d2server | userid2 | passwd2 |

FIG. 6

CENTRALIZED MAPPING OF SECURITY CREDENTIALS FOR DATABASE ACCESS OPERATIONS

RELATED APPLICATIONS

This application is related to the following commonly owned patent applications, each of which applications is hereby incorporated by reference herein in its entirety:

application Ser. No. 09/760,612, entitled "METHOD AND SYSTEM FOR VIRTUALIZING LOGIC BETWEEN DISPARATE SYSTEMS", filed Jan. 16, 2001;

application Ser. No. 09/881,374, entitled "METHOD AND SYSTEM FOR PROVIDING ACCESS TO COMPUTER RESOURCES THAT UTILIZE DISTINCT PROTOCOLS FOR RECEIVING SECURITY INFORMATION AND PROVIDING ACCESS BASED ON RECEIVED SECURITY INFORMATION," filed Jun. 14, 2001;

application Ser. No. 09/969,956, entitled "METHOD FOR CORRELATING DATA FROM EXTERNAL DATABASES," filed Oct. 3, 2001;

application Ser. No. 09/877,609, entitled "METHOD FOR PROCESSING EXTERNAL DATA FOR ACCESS AND MANIPULATION THROUGH A HOST OPERATING SYSTEM", filed on Jun. 8, 2001; and application Ser. No. 09/877,513, entitled "VIRTUALIZING EXTERNAL DATA AS NATIVE DATA", filed on Jun. 8, 2001.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF INVENTION

The invention generally relates to the field of database access systems, and more particularly to enterprise integration systems that enable data access to and from external data sources such as legacy systems.

Organizations typically store business information in a variety of databases using a variety of platforms. For example, an organization may employ a Peoplesoft™ information base for managing human resources, an IBM DB2™ system for accounting purposes; and an Oracle™ database system for manufacturing activities. It can often be advantageous to integrate such enterprise information and make it accessible at a single terminal in order to provide the user with meaningful information concerning the status of an organization. A variety of tools for doing this are commercially available such as the Domino Enterprise Connection Services™ (DECS) or Lotus Enterprise Integrator™ (LEI) tools for use with the Domino™ web application development platform marketed by Lotus Development Corp. These interactive and high speed database query products typically have a server engine for processing applications. When access to an external data source is required, the engine typically calls a connector function in order to access the external database and translate requests between the native system and the external system.

In order to access the external system, security credentials must usually be presented. In the prior art integration tools from Lotus Development Corp., the engine either passed along default security credentials or requested security credentials from the user prior to making the connection to the external database. Both of these techniques have shortcomings, as explained in greater detail below. A more practical method is desired to establish connections to external databases, preferably without having to make substantial changes to the database query products or any applications developed by such products.

SUMMARY OF INVENTION

Generally speaking, the invention establishes connections to external databases automatically using credentials for the user that are appropriate for the external database.

One aspect of the invention provides a method of facilitating access to one or more external databases from a database application. The method includes (a) pre-populating a credential database which maps a user's security credentials relative to the application with the user's security credentials relative to each external database; (b) determining when the user operates the application so as to require access to a given one of the external databases; (c) retrieving the user's security credentials for the given external database from the credential database based on the user's security credentials for the application; and (d) establishing a connection to the given external database using the retrieved security credentials in order to perform the requested database access.

Another aspect of the invention provides a remote database access system. The system includes a server engine for processing an application. An extension manager, interfacing with the server engine, registers and monitors events which require access to a remote database. An enterprise connection service, interfacing with the extension manager, maps data fields from the remote database to data fields employed in the application. The enterprise connection service also enables a user to pre-populate a credentials database which stores the user's security credentials relative to the remote database. A credential manager, initiated by the enterprise connection service, looks up the user's security credentials in the remote database. A connection broker is provided for establishing a connection to the remote database using the security credentials received from the enterprise connection service. A connector translates the database access requests between the application and the external database.

Computer readable media carrying software for implementing the above method and system are also claimed.

BRIEF DESCRIPTION OF DRAWINGS

The foregoing and other aspects of the invention will become more apparent from the following description of illustrative embodiments thereof and the accompanying drawings which illustrate, by way of example, the principles of the invention. In the drawings:

FIG. 3 is a diagram of a form for specifying particulars of an external database in the preferred embodiment;

FIG. 4 is a diagram illustrating the field structure of a form in the preferred embodiment;

FIG. 5 is a diagram of a form for mapping the fields of the form shown in FIG. 4 to the fields of the database specified in FIG. 3; and FIG. 6 illustrates the structure of a credential mapping database for use with the preferred embodiment.

DETAILED DESCRIPTION OF ILLUSTRATIVE EMBODIMENTS

Figure 1:
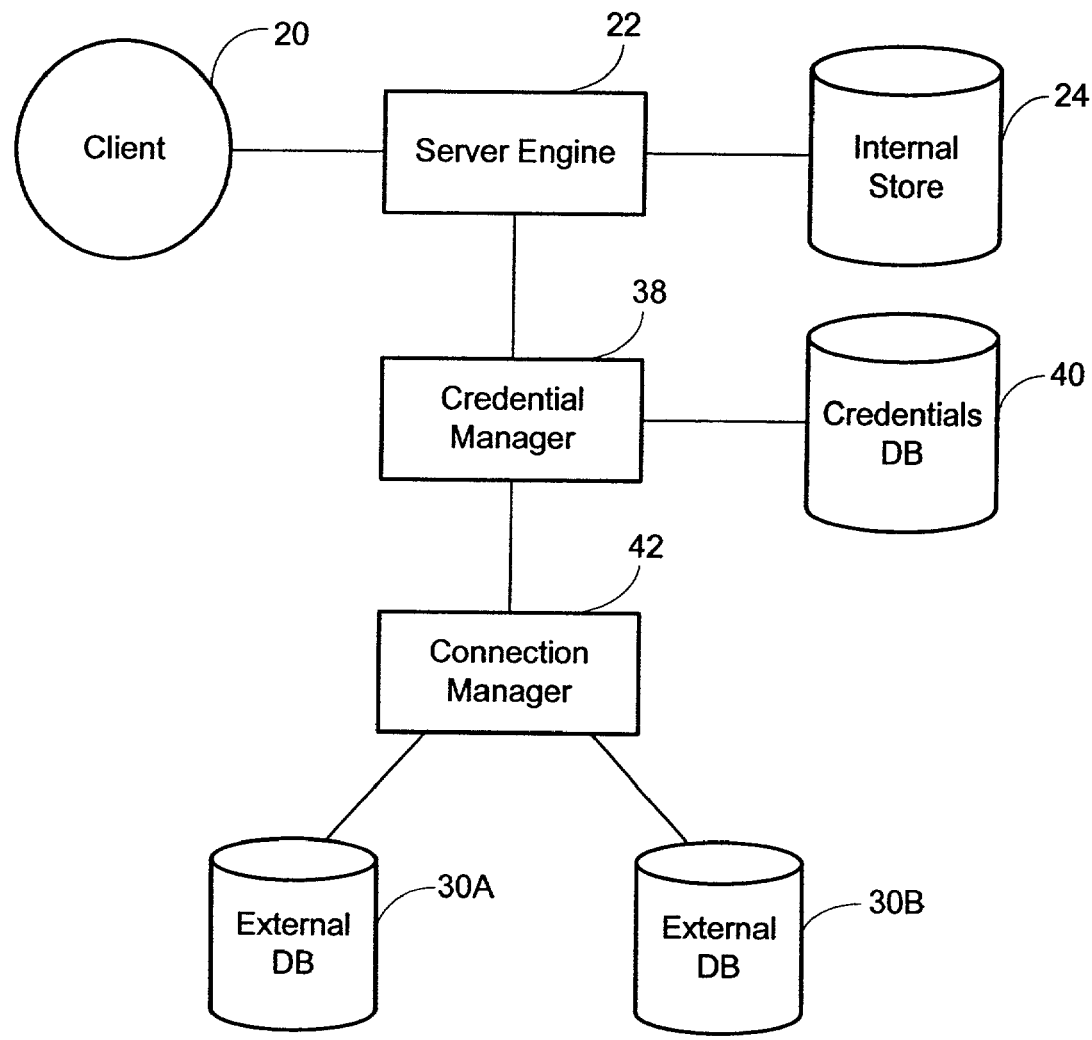
FIG. 1 is a general system block diagram of a client-server based database query product which includes a credential mapping facility according to one embodiment of the invention.

FIG. 1 shows a system block diagram illustrating the general principles of the invention. The illustrated system is based on a client-server architecture wherein one or more client devices 20 interact with a central server engine 22 through a communications network (not shown) such as a local or wide area network. The server engine 22 is connected to an internal data store 24 and provides information therefrom to the client devices 20 upon user request. For purposes of this application, the data store 24 is "internal" to the server 22 in the sense that once a user has logged onto the server or an application running thereon, the security credentials such as user name and password presented to the server or application define the user's visibility with respect to the information stored in the data store 24.

The data store 24 contains the logic necessary to execute one or more business applications. In the illustrated embodiment, the logic can be declarative in nature, that is, embedded in structured documents which the server engine 22 can parse and process as known in the art. This logic may also be explicitly programmed such as in the form of compiled or interpretable source code embedded in the documents or alternatively provided as executable files.

Some of the documents or executables stored in the data store 24 may have data links to external data stores 30. For example, a "form" document may have a number of form fields linked to an external relational database 30A. Thus, when the user executes a query using this document the server engine 22 must access the external relational database 30A and retrieve the requested information therefrom. This poses a connection and security access problem relative to the external database since the server 22 can host many users, some of whom may have relatively unfettered access in the server application but may not have the same access privileges in the external database.

The conventional approach to handling this problem is to rely on a single set of default security credentials that are used by the server to access the external database. However, this approach can be quite limiting in its practicality since system administrators, not knowing who will access the data, will generally set up the default access privilege to a lowest common denominator. Thus, for instance, either all users have write access to the external database, or no users do. Another way to approach this problem is for the server engine 22 or application executables to request security credentials from the user each and every time the user initiates access to an external data store. This can be a nuisance in practice.

The illustrated system employs a pre-populated credential mapping database 40 in which the user's security credentials for the server business application are relationally linked with the user's security credentials for each external data store that may be accessed. This database 40 is populated only once. Preferably, the server engine 22 is expanded to include a utility function designed to capture and store the user's credential information for each of the other external data stores the user wishes to access. These external credentials are then relationally linked to the credentials the user employed to connect to the server application in the first instance, which information is typically captured by the server engine and stored as a system environment parameter. To ensure security, access to the credential mapping database 40 is preferably restricted such that only that user can view or update his or her credential mapping record in database 40.

Having the pre-populated mapping database 40 enables a credential management function 38 to receive a request for externally sourced data from the server engine 22. The request specifies the external data store, and the particular fields or data requested therefrom. In a multi-user system, the request also includes or is accompanied with information indicating which user made the request. The credential management function 38 uses this information to look up the user's security credentials in database 40 relative to the requested external source.

The extracted security credentials are then passed to a connection manager 42. This component is responsible for taking data requests from the server engine 22 and translating them into requests that can be interpreted by the external data store, and vice versa. The connection manager 42 preferably also includes the requisite logic to establish and manage multiple connections to the external data store. In this case, the security credentials extracted by the credential management function 38 are used to establish a connection with the external data store, e.g., the connection manager logs onto the external data store using the extracted or retrieved user name and password. The connection manager keeps track of the connections which have been established so in the event a connection has already been established using the presented security credentials, that connection can be re-used.

Figure 2:
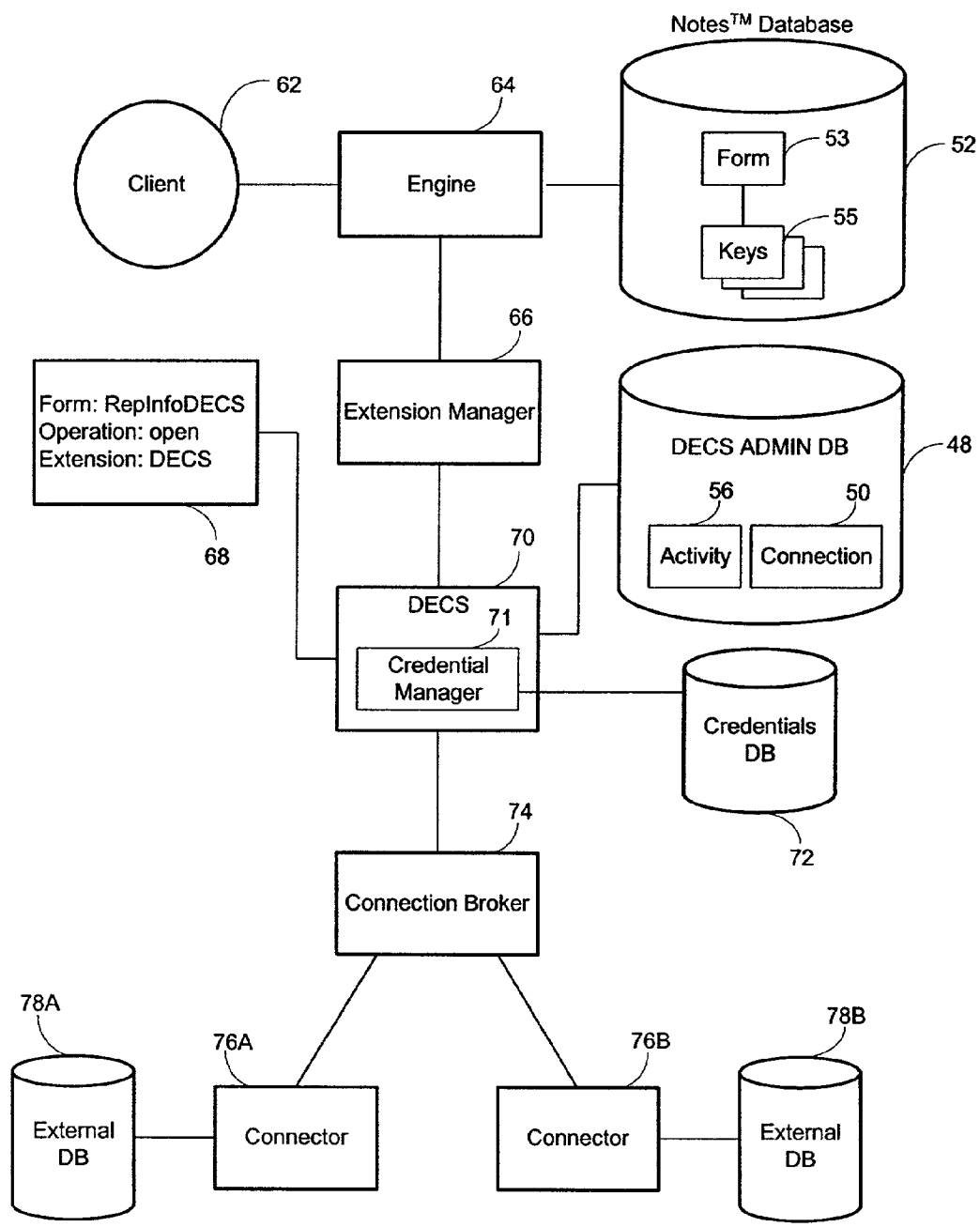
FIG. 2 is an architectural diagram of an interactive database query product which includes a credential mapping function according to a preferred embodiment of the invention.
Figures 3, 4:
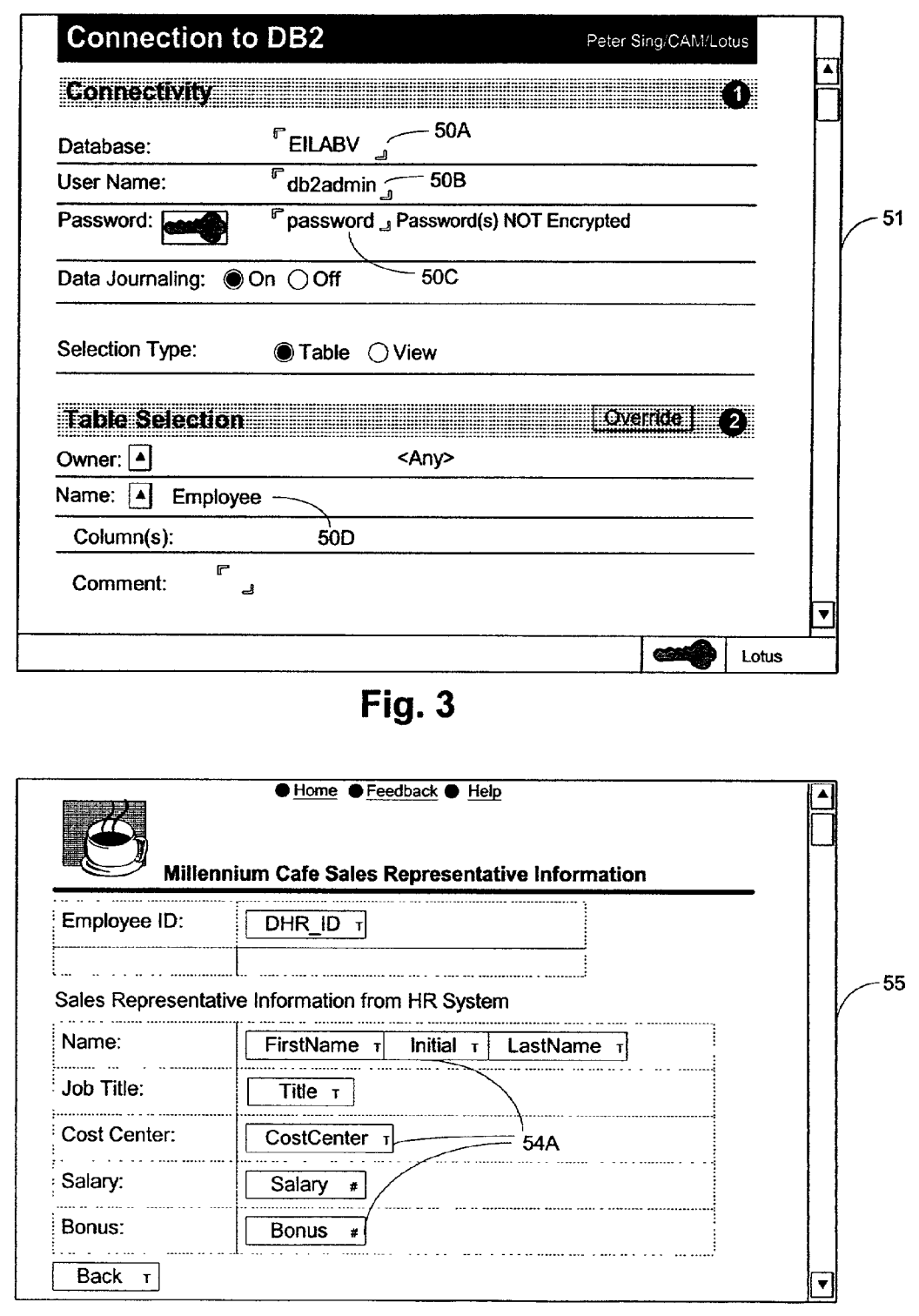

FIG. 2 shows a system block diagram where the invention is deployed within the context of a commercially available enterprise integration product, the Domino Enterprise Connection Services™ (DECS) tool from Lotus Development Corp. DECS™ provides a forms-based interface in order to enable integrated connectivity to external data from DOMINO™ applications. The DECS tool 70 enables the operator to specify external databases or transaction systems by means of "connection documents" 50, an example of which is shown in FIG. 3 for defining a connection to an external DB2 database system. Within the connection document 51 of FIG. 3 the operator can specify the name 50A of an external database, in this case "dB2admin"; default security credentials, in this case a user name 50B and password 50C; and the identity of a table 50D in the DB2 database, in this example the "Employee" table. Once the table 50D is specified, the columns or fields in the table are extracted from the DB2 database, as known in the art, and presented to the user. The connection document 50 forms one element in a DECS administration database 48.

DOMINO™ applications are associated with, among other objects, a Notes™ database 52 and form definitions 54 which provide the user interface for the database 52. FIG. 4 shows an example of a form 55 (named "RepInfoDECS") in which a variety of data fields 54A can be defined, as known in the art.

The data for these fields 54A can be linked to an external database by means of an activity document 56, which also forms an element of the DECS administration database 48. FIG. 5 shows an example of an activity document 57 in which the various fields 54A of form 55 (shown in FIG. 4) are linked to the "Employee" table 50D of the external database specified in the connection document 51 (shown in FIG. 3). More specifically, block 58A identifies the DOMINO application and the form ("RepInfoDECS") which will be linked to an external database system. Block 58B identifies the external database system ("dB2admin") and the table 50d ("Employee") which serves as the source for the data fields of form 55. Block 58C provides the mapping between form fields 54A to the fields of table 50D. Block 58D specifies predefined event(s) associated with the form which DECS70 should monitor and, upon the occurrence of such events, initiate a data access request to or from the external database. Under DECS, such events include opening a form, creating a new record using the form, and deleting a record using the form.

Once the connection, form and activity documents 51, 55, and 57 have been created, the operator then initializes the Notes™ database 52 with the key values for all the records on the external system that may be accessed. The DECS menu features an action for automatically doing this, resulting in key documents or records 53 being created.

In operation, referring to FIG. 2, web browsers or Notes™ clients 62 may request documents from the DOMINO server engine 64, which requires a form to be opened. The engine 64 opens the Notes™ database 52 and retrieves a key document or record, for example, an instance of the Employee ID key field "DHR-ID" shown in FIG. 4 which is stored in one of key documents 53. The server then consults an extension manager 66 to determine if any server add-in tasks have registered to handle database events. Continuing with the examples presented in FIGS. 3–5, DECS 70 will have registered to receive events, and consequently a "form open" event is passed to DECS. DECS determines whether or not the received event is for a database and form and that DECS is monitoring. In this case, DECS finds a corresponding entry 68 in operational memory which indicates that 'post open' events for form "RepInfoDECS" 55 are processed as specified by activity document 57. The document 57 indicates that for this form 55, the key field is intended to be used to retrieve additional information from a DB2 database, specifically the field list 58C from the external source.

The extension manager 66 receives from the engine 64 the user name associated with the client 62 which made the document request. This is passed to DECS 70 which, in turn, calls a credential manager 71 that is responsible for looking up the user's security credentials in a credentials database 72. This database is pre-populated with the user's name and security credentials for each external database that may be accessed. As explained previously, this database need only be populated once, and an example of this database is shown in FIG. 6. The activity document 57 retrieved by DECS 70 indicates at block 58B the type of external database and the database name (DB2 and "Employee"), and this information provides the lookup parameters for the credential manager 71. The lookup is preferably carried out using a "best match" strategy, and need not have to match exactly the situation being encountered. For example, if the credentials database entry for user X contains entries specifying both DB2/userid1/password1 and DB2/db2server/userid2/password2, only in cases where the requested server is named 'd2server' will userid2/password2 be used. All other DB2 requests will be attempted using userid1/password1.

The retrieved external system credentials are then added to the field list requested from the external source, and DECS 70 passes the data request to a connection broker 74, which is responsible for managing connections to the various external databases. The connection broker 74 creates a new connection to the requested external database 78 using the retrieved security credentials passed along in the field list, or, in the event a connection has already been opened using the retrieved security credentials, re-uses the connection. The connectors 76 provide translation between Notes™ and the external database. The requested fields are thus retrieved from the external database and passed back to DECS 70 which maps the external fields into the Notes™ form fields 54A as specified in the activity document 57. The data is then passed back to the server engine 64 for presentation to the client 62.

It should be appreciated that the foregoing implementation does not require any modifications to the server engine 64, the extension manager 66 or the connection broker 74. Rather, the credential mapping facility is conveniently implemented as an additional function within DECS and the pre-existing architecture. This system can also be used to link a form to more than one external database. In this case, multiple activity documents 56 may be created thereby resulting in multiple event registrations 68 which, in turn, will cause the process described above to be repeated for each link to an external database.

Those skilled in the art will appreciate that numerous modifications and variations may be made to the above-described embodiments without departing from the spirit and scope of the inventions.

What is claimed is:

1. A method of facilitating access to one or more external databases from a database application, comprising:
   pre-populating a credential database which relationally maps a user's security credentials relative to said application with said user's security credentials relative to each said external database;
   determining when said user operates said application so as to require access to a given one of said external databases;
   retrieving said user's security credentials for said given external database from said credential database based on said user's security credentials for said application; and
   establishing a connection to said given external database using said retrieved security credentials in order to perform the requested database access.

2. The method according to claim 1, wherein said security credentials include one or more of a user name and password.

3. The method according to claim 2, wherein said retrieval is based on a best match strategy.

4. A database access method, comprising:
   establishing one or more data links from an application to one or more external databases;
   providing a pre-populated database which relationally associates at least one credential employed in said application to identify a user with security credentials employed in each said external database to identify said user and said user's scope of access; and in the event said user activates one of said data links, retrieving said user's security credentials for the corresponding external database and executing an external database access call using said retrieved security credentials.

5. The method according to claim 4, wherein said security credentials include a user name and password.

6. The method according to claim 5, wherein said retrieval is based on a best match strategy.

7. A remote database access system comprising:
a server engine for processing an application;
an extension manager, interfacing with the server engine, for registering and monitoring events which require access to a remote database;
an enterprise connection service, interfacing with the extension manager, for mapping data fields from the remote database to data fields employed in the application; said enterprise connection service also enabling a user to pre-populate a credentials database which stores the user's security credentials relative to the remote database;
a credential manager, initiated by the enterprise connection service, for looking up the user's security credentials in the remote database;
a connection broker for establishing a connection to the remote database using the security credentials received from the enterprise connection service; and
a connector for translating database access requests between the application and the external database.

8. The system according to claim 7, wherein the fields are mapped using a forms-based interface.

9. The system according to claim 8, wherein the security credential include a username and password.

10. The system according to claim 8, wherein the credential manager employs a best match strategy for looking up the user's security credentials.

11. A computer readable medium carrying software for facilitating access to one or more external databases from a database application, wherein said software:
enables the pre-population of a credential database which relationally maps a user's security credentials relative to said application with said user's security credentials relative to each said external database;
determines when said user operates said application so as to require access to a given one of said external databases;
retrieves said user's security credentials for said given external database from said credential database based on said user's security credentials for said application; and
establishes a connection to said given external database using said retrieved security credentials in order to perform the requested database access.

12. A computer-readable medium carrying software for:
processing an application;
registering and monitoring events which require access to a remote database;
mapping data fields from the remote database to data fields employed in the application;
enabling a user to pre-populate a credentials database which relationally maps the user's security credentials relative to the remote database;
looking up the user's security credentials in the credentials database;
establishing a connection to the remote database using the security credentials received from the credentials database; and
translating database access requests between the application and the external database.

* * * * *